United States Patent [19]
Palmer

[11] 3,771,626
[45] Nov. 13, 1973

[54] PRESSURIZED SHOCK ABSORBER
[75] Inventor: Dale A. Palmer, Monroe, Mich.
[73] Assignee: Monroe Auto Equipment Co., Monroe, Mich.
[22] Filed: Apr. 4, 1972
[21] Appl. No.: 240,376

[52] U.S. Cl.............. 188/298, 92/60, 188/315, 267/64 R
[51] Int. Cl............. F16f 9/19, F16f 9/40
[58] Field of Search............ 188/298, 315; 138/26, 30; 92/60; 267/64 R

[56] References Cited
UNITED STATES PATENTS
| | | | |
|---|---|---|---|
| 2,628,692 | 2/1953 | Hufferd | 138/30 X |
| 3,536,312 | 10/1970 | Lohr | 267/64 R |
| 2,420,666 | 5/1947 | Joy et al. | 267/64 R X |

Primary Examiner—George E. A. Halvosa
Attorney—Harness, Dickey & Pierce

[57] ABSTRACT

A shock absorber comprising a pressure cylinder having a valved piston reciprocally disposed therein, a reserve tube surrounding the pressure cylinder and defining a fluid reservoir therewith, valve means for selectively controlling fluid flow between the pressure cylinder and the reservoir, a resilient elastomeric diaphragm extending around the outer periphery of the reserve tube, means defining a fluid cavity between the reserve tube and the diaphragm, means for communicating fluid between the reservoir and the cavity and, an outer housing member surrounding the diaphragm and providing an area into which the diaphragm may expand as fluid is communicated into the cavity.

11 Claims, 2 Drawing Figures

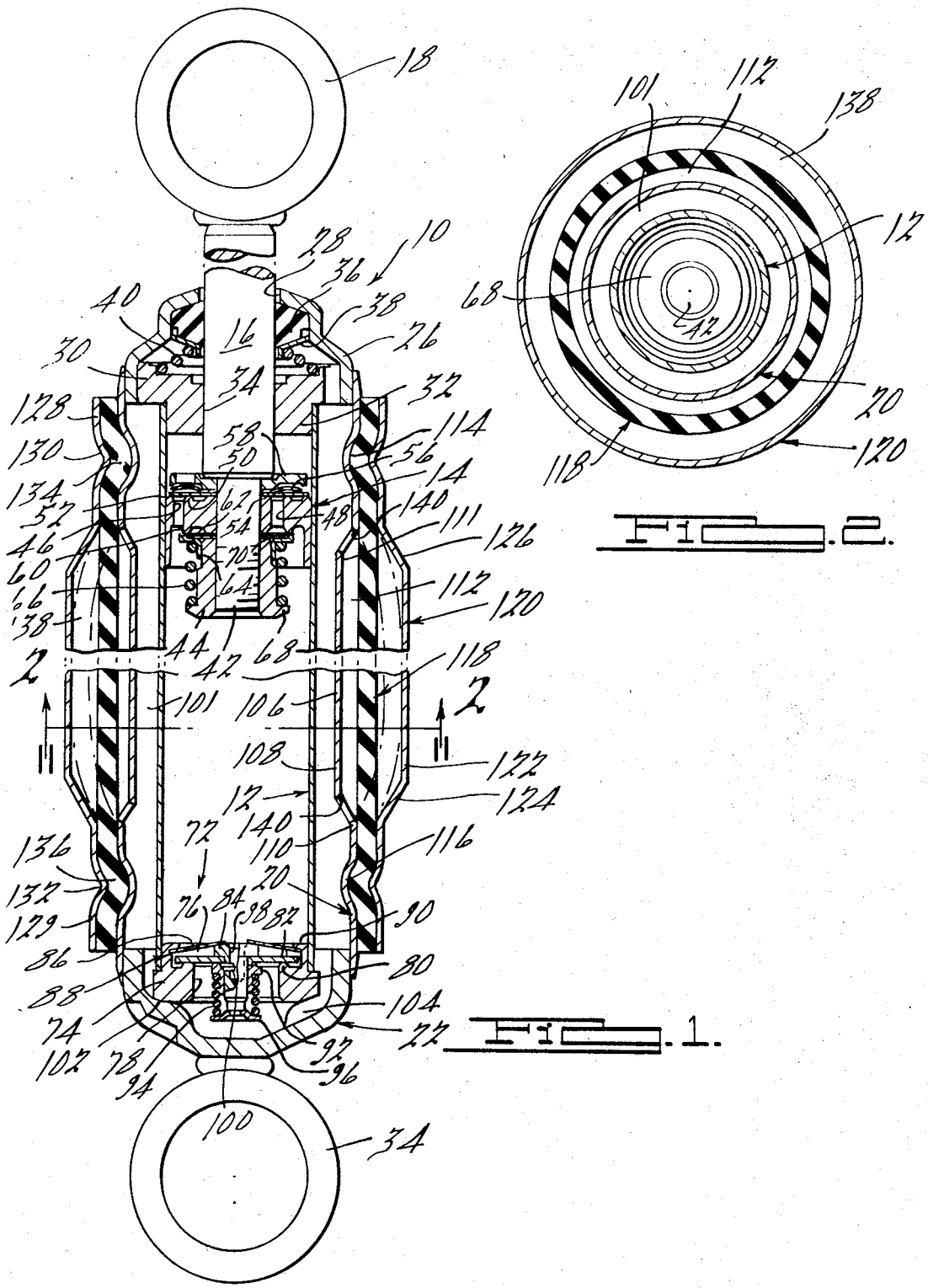

PRESSURIZED SHOCK ABSORBER

BACKGROUND OF THE INVENTION

In a conventional direct-acting shock absorber, during a compression stroke, a volume of fluid equal to the displacement of the rod on which the piston is mounted is displaced from the shock absorber cylinder through a suitable resistance valve in the base of the piston cylinder into a fluid reservoir. On the rebound stroke, the volume of fluid that was displaced from the shock absorber cylinder during the compression stroke is returned thereto through a low resistance valve to refill the cylinder. In order to provide for the pulsing action of the hydraulic fluid between the shock absorber cylinder and the reservoir, a volume of air is retained in the fluid reservoir so that the reservoir level can vary with the displacement flow of the hydraulic fluid. However, this pulsing flow of hydraulic fluid between the shock absorber cylinder and the reservoir causes a high degree of turbulence of the fluid in the reservoir, with the result the hydraulic fluid becomes aerated to a substantial degree. Thus, when the shock absorber completes an extension stroke, that is, on movement of the piston away from the base valve in the cylinder, the cylinder volume between the piston and the base valve is filled with aerated hydraulic fluid. When the shock absorber now starts on a compression stroke, that is, movement of the piston toward the base valve, the volume of air in the oil in the cylinder must be compressed before movement of the aerated hydraulic fluid will begin to flow, first through the resistance valving in the piston and then through the resistance valving in the base valve, to effect control of the rate of compression movement of the piston within the cylinder. This compression of the air in the cylinder takes up a substantial part of the compression stroke of the shock absorber before fluid pressure rises in the cylinder to the control level as regulated by the resistance valving in the piston and in the base valve. The result is a time lag in control of the compression stroke of the shock absorber at a time when control is most needed.

In order to reduce the aeration effect in the hydraulic fluid, various types of devices have been employed in shock absorbers heretofore known and used. Among such devices, baffles and pressurized floating pistons have found wide use in reducing fluid turbulence and thereby minimizing absorption of the air within the fluid. Additionally, deformable gas chambers or cells have been employed, such as those shown in U.S. Pat. No. 3,024,875. While all of the various devices known in the prior art have been, at least to some degree, satisfactory, the utilization of such devices has required substantial modification, if not altogether new tooling and designing, of prior known shock absorber designs. This, of course, has resulted in extremely high production costs which are usually passed on to the consumer.

The present invention is intended to provide a new and improved shock absorber design which not only effectively solves the long-existing problem in connection with hydraulic fluid aeration, but also, and more importantly, provides a shock absorber unit which is intended to utilize virtually all standard components of currently manufactured shock absorber units. Thus, with only minor modification, an existing and already tooled shock absorber design may be provided with a novel arrangement for minimizing fluid aeration so that both the time and expense involved in producing such an improved unit are minimized to the extreme.

It is, therefore, a general object of the present invention to provide a new and improved hydraulic shock absorber which is adapted to be manufactured from existing component parts of a standard multiple-tube shock absorber, and which are to be only nominally modified so as to incorporate an effective means for preventing aeration of the hydraulic fluid employed therein.

It is a more particular object of the present invention to provide a new and improved hydraulic shock absorber of the multiple-tube type which is provided with a generally tubular resilient and deformable diaphragm around the outer or reserve tube thereof, and wherein the reserve tube is slightly modified so as to define a fluid cavity into which the fluid displaced by movement of the piston and piston rod within the shock absorber may enter.

It is a related object of the present invention to provide a shock absorber of the above described type which is adapted to be completely filled with hydraulic fluid and wherein the diaphragm is adapted to expand radially outwardly to accommodate a reduced volume in the pressure cylinder during a compression stroke; and wherein the diaphragm itself is adapted to aid in forcing the oil from the aforesaid cavity back into the pressure cylinder during a rebound stroke.

It is a further object of the present invention to provide a new and improved shock absorber of the above character which is of a relatively simple design, is fabricated of readily available component parts and may therefore be economically manufactured.

Other objects and advantages of the present invention will become apparent from the following detailed description taken in conjunction with the accompanying drawing.

BRIEF DESCRIPTION OF THE DRAWINGS

FIG. 1 is a longitudinal cross-sectional view of a shock absorber embodying the principles of the present invention, and FIG. 2 is a transverse cross-sectional view taken substantially along the line 2—2 of FIG. 1.

DETAILED DESCRIPTION OF A PREFERRED EMBODIMENT

Referring now to FIG. 1, a shock absorber 10, in accordance with a preferred embodiment of the present invention, is shown generally as comprising an elongated tubular shaped pressure cylinder 12 within which a longitudinally reciprocable piston assembly 14 is disposed. The assembly 14 is operatively secured to one end of an elongated piston rod 16 which extends axially outwardly from one end of the cylinder 12 and is provided with a generally ring-shaped attachment element 18 adapted to be operatively secured to either the sprung or unsprung portion of an automotive vehicle or the like, as is well known in the art. The shock absorber 10 comprises a generally cylindrical reserve tube 20 which is arranged coaxially of the cylinder 12 and is spaced radially outwardly therefrom, the lower end of the tube 20 being provided with a lower end cap 22 to which a generally ring-shaped attachment element 24 is secured, the element 24 being adapted to be fixedly secured to the other of the sprung or unsprung portions of the associated vehicle. The upper end of the reserve tube 20 is closed by an upper end cap 26 which is formed with a central angular aperture 28 through which the piston rod 16 extends, as illustrated.

The upper end of the pressure cylinder 12 is closed by a piston rod guide member 30 which is formed with a reduced diameter lower end portion 32 extending into the upper end of the cylinder 12 and is secured in sealed relationship thereto. The guide member 30 is formed with a centrally annular aperture 34 which snugly fits the piston rod 16 as the latter operates or reciprocates relative thereto. A resilient elastomeric seal 36 surrounds the piston rod 16 and is confined within the end cap 26 by means of a retaining element 38 and a coil spring 40, the seal 36 serving to prevent the ingress of foreign material into the shock absorber 10 and to prevent the egress of any hydraulic actuating fluid therefrom.

The lower end of the piston rod 16 is formed with a reduced diameter end portion 42 which is externally threaded and thereby adapted to threadably receive a suitable retaining nut 44 which functions to operatively secure the piston assembly 14 on the piston rod 16. As shown in FIG. 1, the piston assembly 14 comprises a set of circumferentially spaced, axially extending outer apertures or flow ports 46 and a set of circumferentially spaced, axially extending inner flow ports 48. A pair of laterally spaced, concentrically oriented valve seats 50 and 52 are formed on the upper end of the assembly 14 and are adapted to be engaged by a thin, disc-shaped valve member 54 for closing the plurality of outer flow ports 46 when the piston rod 16 is moved upwardly within the pressure cylinder 12. A spring disc 56 urges the valve member 54 into sealing engagement with the valve seats 50, 52, and a suitable apertured retaining washer 58 is disposed above the valve 54.

The lower end of the piston assembly 14 is formed with an annular valve seat 60 that is arranged radially outwardly from the inner set of flow ports 48 and adapted for operative engagement with a thin, washer-like valve 62 which is urged against the valve seat 60 by means of a sleeve 64 which is slidable along the nut 44 and is urged upwardly by a spring 66 which bottoms on a laterally outwardly projecting flange 68 formed at the lower end of the nut 44. A washer 70 is disposed between the upper end of the nut 44 and the valve 62 and is adapted to be operatively held in place, along with the valve 62, by the nut 44. When the piston assembly 14 is moved upwardly within the pressure cylinder 12, fluid under pressure will move downwardly through the flow ports 48 unseating the valve 62 to permit the fluid to pass into the area of the cylinder 12 below the assembly 14, as will be appreciated by those skilled in the art.

The lower end of the pressure cylinder 12 is provided with a compression valve assembly 72 which consists of a head 74 having a portion extending into the end of the cylinder 12 in secured sealed relationship thereto. The head 74 is formed with an enlarged recess 76 at the upper end thereof which communicates with a central annular aperture 78, the upper edge of which is formed with an annular valve seat 80. A washer-like valve 82 rests upon the seat 80 and is secured to a central rivet 84 which is urged downwardly by spring fingers 86 of a spring disk 88, the disk 88 being secured in position by a coined edge 90. The rivet 84 is provided with a slidable sleeve 92 urged upwardly by a spring 94 against the underside of the valve 82, the lower end of the spring 94 being supported by a suitable washer or the like 96 secured to the lower end of the rivet 84. The rivet 84 is formed with a central axially extending passageway 98 communicated with a radially disposed outlet slot 100, with the sleeve 92 being movable downwardly against the force of the spring 94 to permit fluid to pass from the lower end of the cylinder 12 through the passageway 98 into the fluid reservoir 101 defined between the pressure cylinder 12 and the reserve tube 20. The head 74 is provided with a plurality of notches 102 adapted to be engaged by a plurality of embossed areas 104 formed in the end cap 22 to secure the head 74 in fixed relationship therewith, as is well known in the art.

In accordance with the principals of the present invention, the reserve tube 20 is formed with a central radially inwardly depressed area 106 which comprises a generally tubular or cylindrical shaped intermediate section 108 arranged coaxially of the pressure cylinder 12 and spaced somewhat radially closer thereto relative to the remainder of the reserve tube 20. The axially opposite ends of the section 108 are formed with radially outwardly tapered or frusto-conical portions 110 and 111 which define with the section 108, a generally cylindrical cavity 112. The portions of the reserve tube 20 located above and below the portions 110, 111 are formed with radially inwardly depressed embossed portions 114 and 116 which function in a manner hereinafter to be described.

Disposed around the outer periphery of the reserve tube 20 is a tubular or sleeve-like diaphragm, generally designated by the numeral 118. The diaphragm 118 is fabricated of a resilient elastomeric material, such as natural or synthetic rubber, or some other easily deformable elastic material which is entirely fluid impervious. As illustrated in FIG. 1, the diaphragm 118 is coextensive of the cavity 112 and serves to close the outer side thereof.

Extending around the exterior of the diaphragm 118 is a generally tubular or cylindrically shaped outer housing member 120. The member 120 is formed with a radially ourwardly disposed intermediate section 122 which is arranged coaxially of the shock absorber 10 and spaced somewhat radially outwardly from the remainder of the member 120. The opposite ends of the section 122 are formed with frusto-conical portions 124 and 126 that are integrally connected with section 122 of the member 120, the portions 124, 126 in turn being integrally connected to upper and lower generally cylindrical end portions 128 and 129, respectively. In order to fixedly secure the housing member 120 and diaphragm 118 to the shock absorber 10, the upper and lower end portions 128 and 129 are formed with radially inwardly deformed embossed sections 130 and 132 which are axially aligned with the embossed portions 114 and 116 in the reserve tube 20, the embossed portions 114, 116 and embossed sections 130, 132 serving to compressingly or clampingly engage the upper and lower ends 134 and 136 of the diaphragm 118 so as to provide a fluid-tight seal along the inner and outer surfaces thereof confronting the reserve tube 20 and housing member 120. As illustrated, the diaphragm 118 and the outwardly disposed section 122 of the member 120 define an annular cavity 138 which is generally axially aligned with the aforedescribed cavity 112, the latter of which is adapted to be communicable with the interior of the reservoir 101 by means of a plurality of circumferentially spaced apertures 140 formed in the portions 110 and 111 of the reserve tube 20, for purposes hereinafter to be described.

The shock absorber 10 is assembled so that as much air as possible is purged from the interior thereof, and thereafter, the interior is filled with oil or some other suitable hydraulic actuating fluid, the oil filling operation taking place when the piston rod 16 and piston assembly 14 are in their respective fully extended positions to assure that the maximum volume of oil may be introduced into the shock absorber 10.

In operation of the shock absorber 10, during a typical compression stroke, the piston assembly 14 and piston rod 16 will move downwardly within the pressure cylinder 12, and due to the volume of fluid displaced by the piston rod 16, the diaphragm 118 will expand or stretch radially outwardly from the solid-line position shown in FIG. 1 to the dotted-line position shown in this Figure. The degree of expansion will be controlled by the stroke, piston rod diameter, the resilient material from which the diaphragm 118 is fabricated, and the axial length between the secured ends thereof. In addition, for certain types of applications, it may be desirable to preload the cavity 138 by charging the same with a suitable gas at some predetermined pressure, which gas will be compressed during expansion of the diaphragm 118.

It will be seen with the above arrangement that there is no air in contact with the hydraulic fluid so that oil aeration is positively prevented. In addition, the tendency for the hydraulic fluid to undergo shearing or separation is minimized to the extreme. Further, by properly selecting the material from which the diaphragm 118 is made and/or the volume and pressure of the cavity 138, the diaphragm 118 will act to force the fluid into the pressure cylinder 12 during a rebound stroke so that the shock absorber 10 will act as a spring assist for the associated vehicle suspension.

A particular feature of the present invention resides in the fact that the shock absorber 10 may be economically manufactured from readily available component parts which are currently utilized in multiple-tube shock absorber units. That is, the shock absorber 10 may consist of an existing shock absorber having the reserve tube thereof subjected to a rolling operation to form the section 106 and portions 110 and 111, with suitable apertures 140 being provided thereon. Thereafter, the diaphragm 118 and housing member 120 may be mounted by means of well-known rolling or other metal forming techniques, whereby to provide a fluid-tight seal at the upper and lower ends of the diaphragm 118. Accordingly, the tooling, and related manufacturing expenses will be minimized to the extreme.

While it will be apparent that the preferred embodiment illustrated herein is well calculated to fulfill the objects above stated, it will be appreciated that the present invention is susceptible to modification, variation and change without departing from the scope of the invention.

What is claimed is:

1. A direct acting hydraulic shock absorber comprising,
    a pressure cylinder having a valved piston reciprocally disposed therein,
    a reserve tube coextensive of and surrounding said pressure cylinder and defining a fluid containing reservoir therewith,
    upper and lower generally cup-shaped end caps closing the opposite ends of said reservoir,
    valve means adjacent said lower end cap for selectively controlling fluid flow between the said pressure cylinder and said reservoir,
    a generally uniform diameter tubular resilient elastomeric diaphragm extending around the outer periphery of said reserve tube and oriented generally coaxially thereof,
    fluid passage means for communicating fluid between said reservoir and the radially inner side of said diaphragm, and
    a generally cylindrical outer housing member extending around the outer periphery of said diaphragm and providing an expansion area into which said diaphragm may expand as fluid is communicated through said passage means,
    the axially opposite ends of said housing member being secured to the shock absorber in a manner so as to provide a fluid-tight seal between the opposite ends of said diaphragm and the outer periphery of said reserve tube,
    said tubular diaphragm being of substantially the same diameter as said end caps and having an axial length at least as great as the axial length of said expansion area.

2. A shock absorber as set forth in claim 1 wherein said reserve tube is deformed radially inwardly to define a fluid cavity with said diaphragm.

3. A shock absorber as set forth in claim 1 wherein an axially intermediate portion of said housing member is spaced radially outwardly from the opposite ends thereof to provide said expansion area into which said diaphragm may expand.

4. The invention as set forth in claim 1 wherein said housing member has an axial length approximately equal to the axial length of said reservoir.

5. The invention as set forth in claim 1 wherein the axial length of said housing member is approximately equal to the axial length of said reserve tube and has the opposite ends thereof crimped or deformed radially inwardly toward said reserve tube to clampingly secure the axially opposite ends of said diaphragm.

6. The shock absorber as set forth in claim 1 wherein the axial length of said diaphragm is approximately equal to the axial spacing between said end caps and has the opposite ends thereof compressingly secured between the axially opposite ends of said outer housing member and the outer periphery of said reserve tube.

7. A shock absorber as set forth in claim 6 wherein said reserve tube is formed with a plurality of flow orifices for communicating fluid between said reservoir and a cavity defined between a radially inwardly formed portion of said reserve tube and said diaphragm.

8. A shock absorber as set forth in claim 1 wherein said reserve tube is formed with a radially inwardly displaced generally cylindrical section integrally connected to said tube by radially outwardly inclined frusto-conical portions.

9. A shock absorber as set forth in claim 8 wherein said frusto-conical portions are formed with orifices communicating said cavity with said reservoir.

10. A shock absorber as set forth in claim 8 wherein said outer housing member is formed with a radially outwardly disposed cylindrical intermediate section that is integrally connected to said housing member by radially inclined frusto-conical portions.

11. A shock absorber as set forth in claim 10 wherein said cylindrical sections and said frusto-conical portions of said reserve tube and said outer housing member are generally axially aligned, and wherein the opposite ends of said diaphragm are compressed between the opposite ends of said housing member and the outer periphery of said reserve tube to provide a fluid-tight seal in between.

* * * * *